United States Patent [19]

Barloy

[11] 4,255,391
[45] Mar. 10, 1981

[54] APPARATUS FOR INTRODUCING AND MIXING A LIQUID IN AN ESSENTIALLY LIQUID MEDIUM

[75] Inventor: Michel Barloy, Rouen, France

[73] Assignee: Rhone-Poulenc Industries, Paris, France

[21] Appl. No.: 18,750

[22] Filed: Mar. 8, 1979

Related U.S. Application Data

[60] Division of Ser. No. 746,419, Mar. 8, 1979, Pat. No. 4,199,557, which is a continuation of Ser. No. 555,931, Mar. 6, 1975, abandoned.

[30] Foreign Application Priority Data

Mar. 13, 1974 [FR] France .............................. 74 08520

[51] Int. Cl.³ ............................................ B01D 11/04
[52] U.S. Cl. .................................... 422/259; 366/147
[58] Field of Search ............... 423/320, 659; 366/144, 366/147; 422/259, 258, 243

[56] References Cited

U.S. PATENT DOCUMENTS

| 936,182 | 10/1909 | Steidle | 366/9 |
|---|---|---|---|
| 2,528,514 | 11/1950 | Harvey et al. | 422/224 |
| 3,170,761 | 2/1965 | Tanikowski et al. | 422/225 |
| 3,181,931 | 5/1965 | Weber | 422/193 |
| 3,186,803 | 6/1965 | Akaboshi et al. | 422/136 |
| 3,347,620 | 10/1967 | Yamashita | 422/224 |
| 3,888,973 | 6/1975 | Colwell et al. | 423/150 |

Primary Examiner—Hiram Bernstein
Attorney, Agent, or Firm—McDougall, Hersh & Scott

[57] ABSTRACT

Apparatus for introducing and mixing a first liquid with a second liquid in which use is made of a spinning disc for throwing droplets of the first liquid centrifugally outwardly, and an agitator immersed at least partially in the body of the second liquid, spaced below the spinning disc, and displacing second liquid upwardly and outwardly from the body of liquid to intersect the droplets of first liquid thrown from the spinning disc for admixture above the body of the second liquid.

6 Claims, 3 Drawing Figures

APPARATUS FOR INTRODUCING AND MIXING A LIQUID IN AN ESSENTIALLY LIQUID MEDIUM

This application is a division of application Ser. No. 746,419, filed Mar. 8, 1979, now U.S. Pat. No. 4,199,557, issued Apr. 22, 1980, which is a continuation of application Ser. No. 555,931 filed Mar. 6, 1975 and now abandoned.

The present invention concerns a apparatus for introducing and mixing a liquid in a substantially liquid medium, and an apparatus for carrying out the process. The process and apparatus are advantageously used for introducing corrosive liquids into an agitated medium, and more particularly, into a reaction medium which can contain solid particles in suspension.

The handling of corrosive liquids requires certain precautions to be taken, and, so as to avoid locally excessive concentrations, it is necessary to insure that the liquids are effectively dispersed. The apparatus which are currently used, of the spray type, provide a good degree of dispersion, but generally do not permit mixing of the sprayed liquid with the body of the liquid medium in which they are introduced. Now, it is often important for the mixture to be made rapidly, particularly in the case where the liquid which is introduced takes part in reactions.

Among corrosive liquids, concentrated sulfuric acid has a particularly corrosive character and a particularly high viscosity. It also has the property of giving off a substantial amount of heat when diluted in water, and accordingly, introducing concentrated sulfuric acid into an aqueous medium causes the production of additional heat which must often be removed.

This situation occurs more particularly in the production of wet-process phosphoric acid. In the continuous processes, the phosphate-bearing ore, sulfuric acid, and recycled weak phosphoric acid are introduced into a reaction vessel provided with agitator means, and the slurry, which is formed by a suspension of calcium sulfate in the phosphoric acid produced, is continuously discharged, the amount discharged being equivalent to the total volume of the reagents introduced in the same time.

The amounts of concentrated sulfuric acid necessary for rendering the phosphate-bearing ore soluble must be continuously introduced into a reaction system which is generally contained in a vat. Use is advantageously made of a closed and non-compartmented reaction vat, for example the apparatus described in French Pat. No. 1,125,849.

Now, solubilization of calcium phosphate is a reaction which is exothermic in itself, and the introduction of additional heat must be strictly monitored so as to keep the reaction medium within the selected temperature limits. It has been proposed that the sulfuric acid should be introduced after having been diluted by some weak phosphoric acid in an accessory apparatus. In this way the heat of dilution can be removed outside the main reaction vessel, but the mixer apparatus are burdensome, they are subjected to substantial degrees of corrosion, and they provide only a limited output of acid.

Finally, as the reaction between the acids and the ore is very rapid, the mixing zone is the location of precipitation of calcium sulfate which has a tendency to be deposited on the adjacent walls, causing scaling which occurs in addition to the corrosive actions.

Therefore, in order to combine the most important of the desired conditions, in most cases, use is made of a device for introducing sulfuric acid into the main reaction vessel in the zone in which agitation is the most energetic, and the whole of the reaction vessel is cooled.

The process of the invention is distinguished from the known processes, in that it permits the introduction of substantial flows of any liquid, into a substantially liquid medium, while insuring very rapid homogenization, at the same time as it forms a mixture away from any wall, and makes it possible effectively to monitor the heat output. These conditions are particularly advantageous as regards the introduction of sulfuric acid.

The process of the invention makes it possible to introduce and mix a liquid in a substantially liquid medium, comprising a rotary agitator of the type which permits a renewed fraction of the substantially liquid medium to be entrained above the liquid level, in an upward direction, and to be dispersed in the form of a sheet of droplets which move with a centrifugal movement and which fall with a circular motion back into the liquid medium; according to the invention, the liquid is introduced in the form of a substantially vertical jet in a downward direction in the immediate vicinity of the axis of the rotary agitator, and the vertical jet of liquid is converted above the liquid level into a substantially horizontal sheet of droplets which move with a centrifugal movement, by causing the jet to impinge on at least one surface disposed perpendicularly to the axis of the rotary agitator, and the mixture is made at the intersection of the two sheets of droplets.

Advantageously, the said surface is a plane surface secured to the rotary agitator.

The process is also advantageously used for an agitated liquid medium which contains solid particles in suspension.

Preferably, the liquid introduced is cooled by means of a stream of air applied at the location at which the liquid is in the dispersed state above the liquid level, particularly when carrying out the process of the invention for introducing sulfuric acid into a substantially liquid medium.

The invention will be better understood from the following description of some embodiments shown diagrammatically in the accompanying drawings and given by way of illustration.

BRIEF DESCRIPTION OF THE DRAWINGS

FIG. 1 shows a view in cross-section of an apparatus comprising a rotary agitator whose shaft, having an axis 1, and driven in rotation by a motor (not shown), is provided at 2 with radial blades which are partially immersed in the liquid medium 3, and at 4 with a plane disc onto which opens a member 5 for the discharge of a vertical jet of liquid 6. Member 5 is here in the form of a simple tube. The radial blades are mounted in this embodiment at an angle of inclination of about 70°, to the vertical. It will be apparent that, without departing from the scope of the invention, it would be possible to use any other per se known device capable of creating a rising movement, such as an agitator with vertical blades, or a rotary pump, a rotary turbine, a screw, a propeller, etc. The device shown at 2 is here immersed over about half its height.

Figure 1:
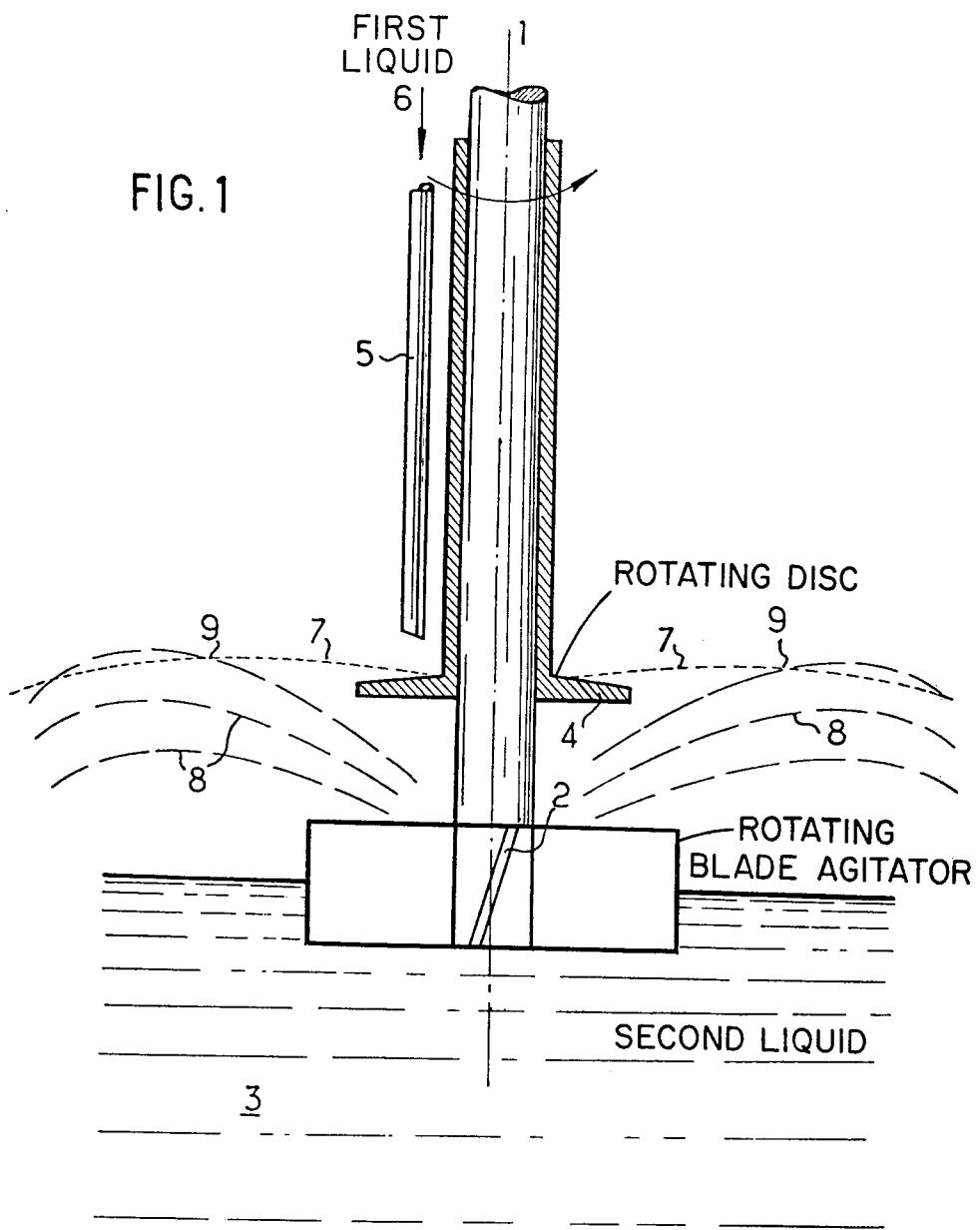
FIG. 1 is an elevational view in cross section of an apparatus embodying the features of this invention.

Reference numeral 7 denotes the liquid in the form of a sheet of droplets which are dispersed horizontally, while reference numeral 8 denotes the circular sheet or sheets of droplets of liquid medium. Reference numeral 9 denotes the zone in which the two liquids are mixed.

Figure 2:
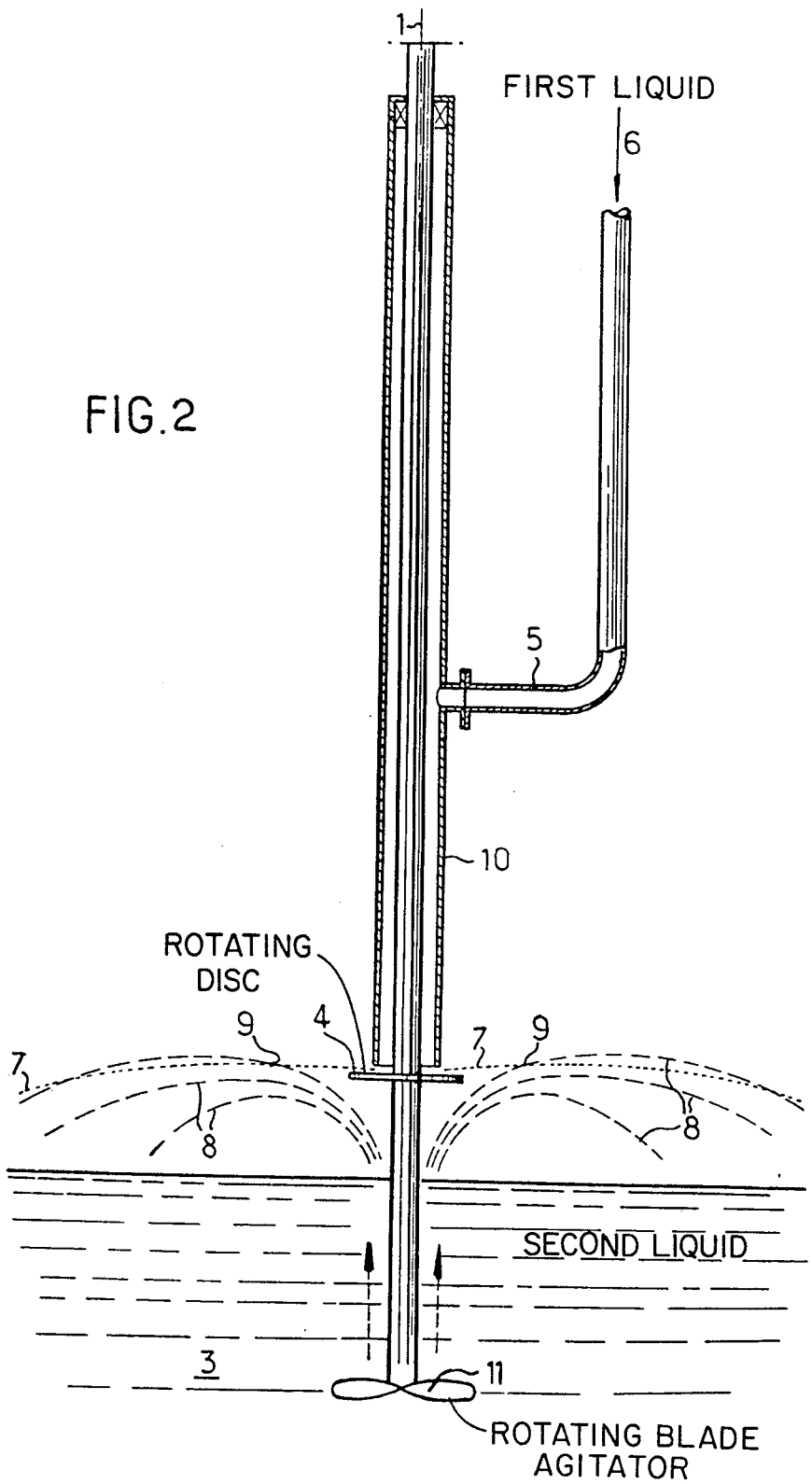
FIG. 2 is a cross sectional elevational view similar to that of FIG. 1 showing a modification in the apparatus of this invention.

FIG. 2 shows a view in cross-section of another embodiment of the apparatus. The member 5 for the jet of liquid 6 is formed by means of an elbow-bent tube connected to a tube 10 which is concentric with the rotary shaft of the agitator. The vertical jet of liquid, which in this case is of annular cross-section, discharges onto the disc 4 as in the first embodiment, and provides a sheet 7 of droplets, in the same form as described above.

The lower part of the shaft 1 is provided in this embodiment with a propeller 11. The liquid medium is drawn up and spreads out in the form of a sheet or a plurality of sheets 8 of droplets in the same form as described above. The two liquids mix at 9, in a similar manner to that described above.

Figure 3:
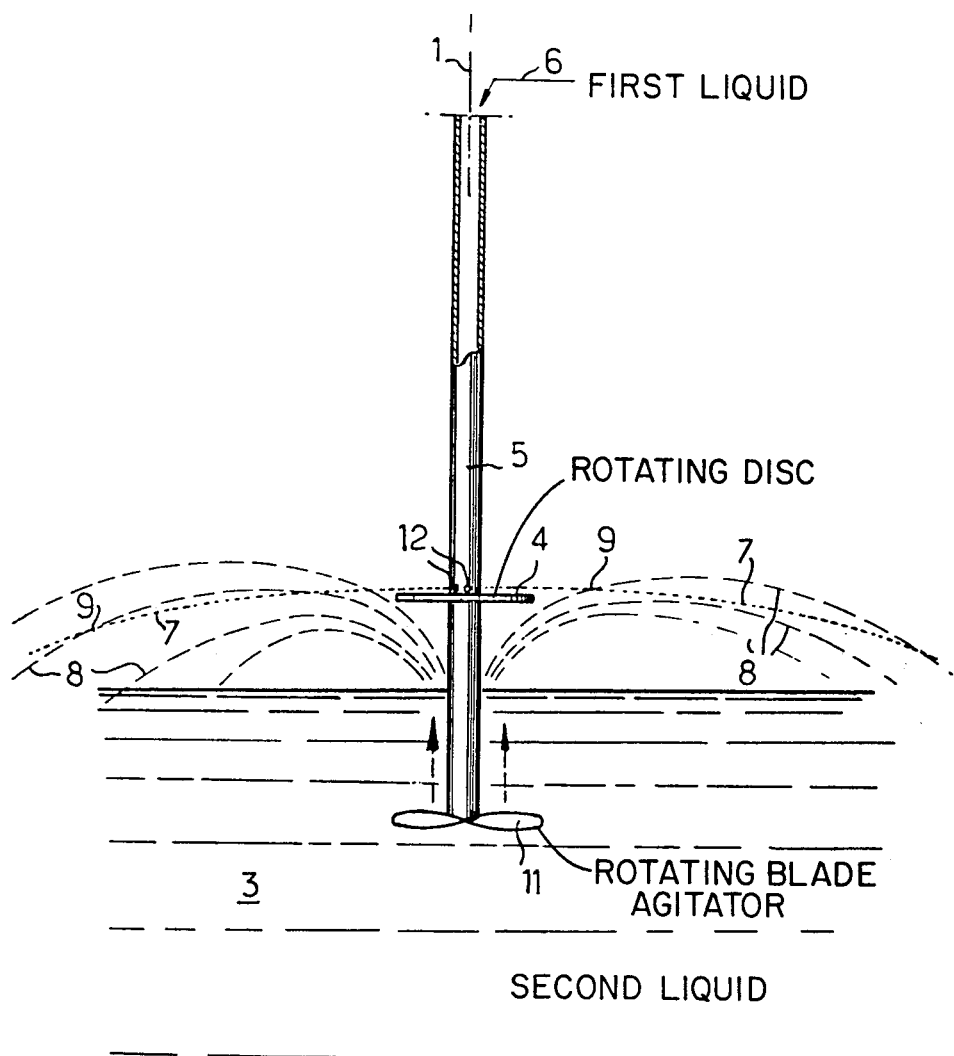
FIG. 3 is a cross sectional elevational view similar to that of FIGS. 1 and 2 showing a still further modification of the apparatus embodying features of this invention.

FIG. 3 shows a view in cross-section of an apparatus which is another advantageous embodiment. The member 5 for the jet of liquid 6 is formed in this embodiment by a cylindrical space 5 provided at the center of the rotary shaft 1.

The space 5 is closed by the disc 4 in its lower part. The liquid which is introduced into the space 5 is discharged by way of apertures 12 at the base of the cylinder 5 closed by the disc 4, arranged as described above. The fraction of the liquid medium displaced by the agitator is dispersed in the form of a sheet or a plurality of sheets 8 of the same form as in the above embodiment, and the two liquids are mixed in a similar manner in the zone 9.

Irrespective of the embodiment used for introducing liquid in accordance with the invention, it is found that mixing of the liquid medium is highly effective and permits the mixing of substantial liquid flow rates. In particular, no local supersaturation has been noted in the production of phosphoric acid, nor has any local or unmonitored rise in temperature been observed.

The apparatus according to the invention, in any one of its alternative embodiments or technical equivalents thereof, can be disposed in an installation for producing phosphoric acid, comprising conventional means for cooling the surface of the reaction medium. In particular, it is possible to use an air sweep, in the space between the surface of the slurry and the cover of the vat; in this way, dilution of the sulfuric acid occurs at the place at which the liquid acid is mixed in the reaction slurry in dispersed form, and the heat of dilution is therefore removed in a highly effective manner, at the very place at which it is produced.

The device for introducing liquid in accordance with the invention is very simple in design, which makes its construction and maintenance economical. This advantage, which is particularly important in the operation of introducing sulfuric acid, in particular in producing wet-process phosphoric acid, is obviously to be found in all the other possible uses.

Two examples of use are given hereinafter by way of non-limiting illustration of the invention.

EXAMPLE 1

The apparatus of FIG. 1 is used in the continuous production of phosphoric acid by a wet process, comprising—vat provided with conventional equipment (not shown), including the inlet for the phosphate-bearing ore and recycled weak phosphoric acid, a device for discharging slurry, a cover, a central agitator, and accessory equipment.

The agitator which is driven by a shaft rotating at 70 rpm is particlly immersed in the slurry and throws it up above the surface level which is formed with relief portions which are so disposed as to spread the displaced liquid slurry out in the form of fine droplets which are uniformly distributed over a paraboloid of revolution which is about 3 meters in diameter.

10 $m^3/h$ of sulfuric acid at 40° C. is introduced by way of the tube 5.

In spite of the heat of dilution of the sulfuric acid, the temperature of the mixing zone remains lower than 85° C., when there is no accompanying cooling. By operating the cooling device which provides a sweeping air flow, the temperature of the mixing zone in kept to a lower level, notably 80° C. The mean temperature of the reaction vat is of the order of 75° C. and the precipitated calcium sulfate is in the dihyrated state.

By way of comparison, in a process of producing phosphoric acid in which the sulfuric acid and the recycled phosphoric acid are mixed in a mixer of known type, it is found that the temperature of the mixture reaches 110° C. in the mixer which is moreover the location of substantial scaling and corrosion.

EXAMPLE 2

An apparatus of the type illustrated diagrammatically in FIG. 2 is disposed in the same installation for the continuous production of wet-process phosphoric acid as in the above Example, with a cover being disposed above the reaction medium at a height of about 1 meter. The level of the reaction medium can vary approximately 10 cm above or below the mean level, without affecting operation of the apparatus. The agitator, which is driven by a shaft turning at 1450 rpm is immersed to a depth of 200 to 500 rpm, displaces the slurry at a flow rate of about 400 $m^3/h$, and projects it in the form of uniformly distributed, fine droplets.

The tube 5 is used to introduce the same sulfuric acid, at the same flow rate, as in the above Example. The temperature of the mixing zone is 80° C., and the whole of the reaction medium is at a mean temperature of about 75° C., and the reaction medium is virtually homogeneous.

I claim:

1. Apparatus for introducing and mixing a first liquid with a second liquid in which the latter is present as a body of liquid confined within an enclosure, means for flowing the first liquid in a linear stream downwardly towards the body of the second liquid, a disc mounted for rotational movement located in spaced relation above the body of liquid, means for rotating the disc at high speed in the path of the downwardly moving stream of the first liquid whereby the stream of the first liquid is intercepted by the rotating disc and thrown centrifugally outwardly from the disc as droplets, an agitator mounted for rotational movement at high speed about an axis aligned with the axis of rotation of the disc with at least a portion of the agitator immersed in the body of the second liquid whereby a portion of the second liquid is displaced by the agitator from the body of liquid as droplets which spread upwardly and outwardly along an arcuate path above the body of liquid and which intersects with the droplets of first liquid thrown from the disc member whereby a mixture of the two liquids occurs at the intersection above the body of liquid.

2. Apparatus as claimed in claim 1 in which the disc is mounted for rotational movement in a substantially horizontal plane.

3. Apparatus as claimed in claim 1 in which the agitator is formed with relief portions which are so disposed as to impart to the fraction displaced from the body of liquid, a form close to a paraboloid of revolution, which falls back into the body of liquid.

4. Apparatus as claimed in claim 2, characterized in that it comprises a substantially vertical tube disposed adjacent the axis of the agitator at the upper end of which tube the liquid is introduced with the lower end opening onto a disc, so as to produce a substantially horizontal sheet of droplets, and so as to cause the substantially horizontal sheet of droplets of liquid to intersect above the liquid level with the fraction of a second liquid displaced above said level.

5. Apparatus as claimed in claim 1 which includes a shaft on which the agitator is fixed for rotational movement, characterized in that for introducing the liquid, it comprises an annular space concentric to the rotary shaft, said space being laterally delimited by a cylindrical sleeve member whose diameter is greater than the diameter of the shaft, and communicating with an inlet for the first liquid, in its upper part by a protective cap, and in its lower part by the disc fixed to extend perpendicularly to the shaft of the agitator, the sleeve member being separated from the disc by an adjustable clearance which permits the liquid to pass, so as to cause the substantially horizontal sheet of droplets of first liquid to intersect above the level of the body of liquid with the fraction of substantially liquid medium that is displaced above said level.

6. Apparatus as claimed in claim 5, which includes apertures in the sleeves so as to cause the substantially horizontal sheet of droplets of first liquid to intersect above the liquid level with the displaced fraction of second liquid dispersed above said level.

* * * * *